Aug. 31, 1954 A. ROSE 2,688,048

COLOR TELEVISION IMAGE REPRODUCTION

Filed Oct. 5, 1950 2 Sheets-Sheet 1

INVENTOR
Albert Rose
BY [signature]
ATTORNEY

Aug. 31, 1954 A. ROSE 2,688,048

COLOR TELEVISION IMAGE REPRODUCTION

Filed Oct. 5, 1950 2 Sheets-Sheet 2

INVENTOR
Albert Rose
BY
[signature]
ATTORNEY

Patented Aug. 31, 1954 2,688,048

UNITED STATES PATENT OFFICE 2,688,048

COLOR TELEVISION IMAGE REPRODUCTION

Albert Rose, Princeton, N. J., assignor to Radio Corporation of America, a corporation of Delaware Application October 5, 1950, Serial No. 188,503

13 Claims. (Cl. 178—5.4)

This invention relates to the reproduction of television images substantially in their natural colors. It relates particularly to systems which may be operated in a manner to achieve improved performance by requiring image-reproducing apparatus which may be more economically constructed than heretofore.

In order to reproduce an image in color by any of the presently known television systems and apparatus, it is necessary to generate and transmit signals representative not only of the picture detail, but also of the color content. While the present invention is not necessarily limited thereto, it will be described particularly in connection with a color television system operating according to the time division multiplex principle. One such system forms the subject matter of a copending U. S. application of John Evans, Ser. No. 111,384, filed August 20, 1949 and titled "Color Television." In such a system the transmitted video signal wave has instantaneous amplitudes representing, respectively, the different color components of successive elemental areas of the image to be reproduced.

In order that such a system be capable of operating according to the present standards established for the transmission and reception of black and white television signals, it is necessary that the video signals contain a large number of relatively high frequency components. In order to accommodate video signals of such a character in a band width of approximately 4 mc. the principle of mixed high frequencies has been proposed for use. One such system operating according to the mixed high frequencies principle forms the subject matter of a copending U. S. application of Alda V. Bedford, Ser. No. 117,368, filed September 23, 1949, now Patent No. 2,677,720 issued May 4, 1954, and titled "Color Television Systems." In accordance with the mixed high frequencies principle, the relatively high frequencies of the transmitted video signal represent the detail or high definition portion of the image. The relatively low frequency component of the transmitted video signal represents the color information. Heretofore, a composite or mixed signal has been formed and utilized as such at the signal-receiving and image-reproducing points.

By means of the mixed high frequencies principle substantial economies have been achieved in the signal transmission system. The present invention provides for the achievement of similar economies at the signal-receiving and image-reproducing points. Also, by reason of these economies, substantial improvements in the performance of the image-reproducing apparatus may be accomplished.

Accordingly, it is an object of the present invention to effect improved color television image reproduction in a manner whereby advantage is taken of the economies of apparatus construction afforded by the use of the mixed high frequencies principle.

Another object of the invention is to provide an improved color television image-reproducing system in which the image detail and image color information are separately reproduced and the two reproductions are combined to form a complete color image.

In accordance with the present invention, color television image reproduction is effected by a system which includes apparatus for receiving video signals that are representative of the image to be reproduced. The particular video signals to be received consist of a relatively low frequency component and a relatively high frequency component. One of the video signal components is representative of a plurality of the component image colors and the other video signal component is representative of the image detail. One reproducing system, in accordance with the present invention, also includes cathode ray apparatus having separate electron beam development facilities which are responsive, respectively, to the two video signal components. Also included in such cathode ray apparatus is luminescent screen structure of a character to reproduce the component image colors in response to excitation by electron beam energy developed by one of the provided facilities. The cathode ray apparatus includes additional luminescent screen structure capable of reproducing, in response to excitation by electron beam energy developed by the other provided facility, a black and white representation of the detail of the image to be reproduced. The two luminescent screen structures are arranged in such a manner that the respective reproductions made thereon may be viewed simultaneously in substantially exact optical registration.

It will be more fully understood from the following description of a number of illustrative embodiments of television image reproducing systems in accordance with this invention that the principles underlying the invention are not limited for use in any particular system employing specific apparatus. In general, the underlying principles of the invention comprise a novel method of reproducing television images substantially in their natural colors. The image reproduction is made from video signals which have two frequency components, one of which is relatively high and the other of which is relatively low. The details of the image are represented by one of the video signal components and the component image color information is represented by the other video frequency component. In accordance with one step of the novel method comprising this invention, the video signal is separated into its high and low frequency components. One of these components, for example the relatively high frequency component, is employed to make a black and white reproduction of the image detail. The other of the video signal components, for example the relatively low frequency one, is used to reproduce the component colors of the image. The black and white and color reproductions are combined in a manner to form a complete color television image.

It also will become more apparent from the following detailed description of the invention that the color image-reproducing apparatus does not need the fineness of structural detail that is required in color image-reproducing apparatus operating in a more conventional manner, because the color image-reproducing apparatus in the present system is not required to reproduce the fine detail of the image. Accordingly, the color image-reproducing apparatus may employ much coarser electrode structures. Since such apparatus may be made with less precision than similar apparatus employed in prior art systems, it is seen that substantial economies of construction may be achieved.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 1, 2:
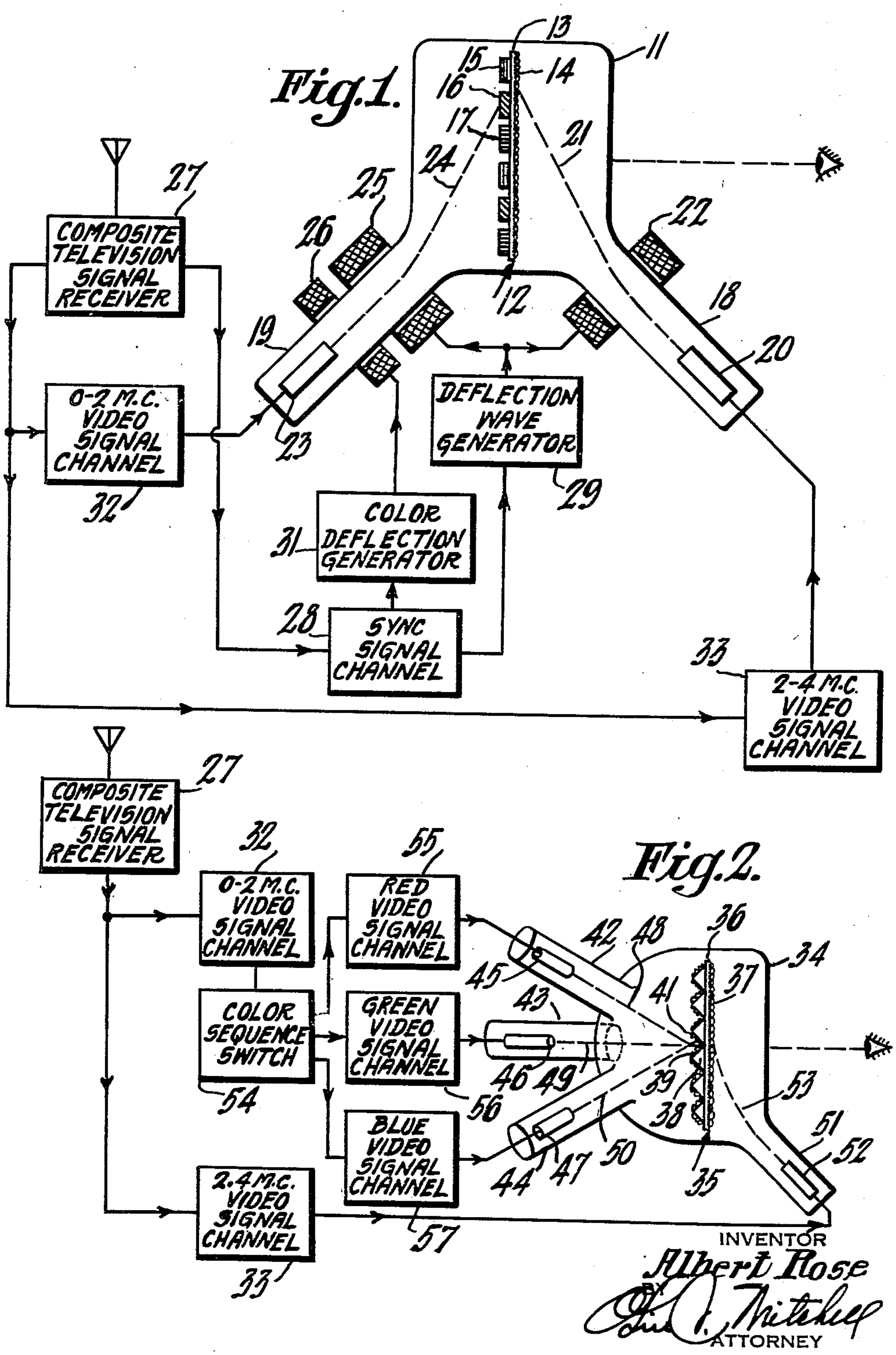
Figure 1 is a block diagram of a typical color television signal-receiving and image-reproducing system embodying the invention and in which a cathode ray tube having a line phosphor color luminescent screen is used.
Figure 2 is a diagrammatic illustration of another embodiment of the invention employing a cathode ray tube having a directional multi-color-producing screen.

Reference first will be made to Figure 1 of the drawings. In this form of the invention, the image-reproducing device comprises cathode ray apparatus in which the luminescent screen is a two-sided structure, both of which may be viewed simultaneously. Such apparatus is represented by the tube 11. The target electrode 12 of this tube comprises a transparent support such as a comparatively thin sheet of mica 13. On one side of the support 13 there is provided a conventional phosphor screen 14. The screen 14 is of a character to produce a black and white image in response to electronic excitation. On the other side of the support 13 there is mounted a line phosphor screen in which the different phosphor lines produce differently colored light in response to electronic excitation. As viewed in the drawing, the color luminescent screen comprises a multiplicity of groups of phosphor strips or lines extending in a direction normal to the plane of the drawing. Each group of phosphor lines or strips includes at least one capable of reproducing each of the component image colors. For example, in a three-color system, one group of phosphor lines includes red, green and blue light-producing strips 15, 16 and 17 respectively. A representative tube having a screen of this general type is disclosed in U. S. Patent 2,446,791 granted to A. C. Schroeder on August 10, 1948, and titled "Color Television Tube."

The cathode ray tube 11 is provided with two angularly extending tubulations or necks 18 and 19. The electronic apparatus for exciting the two luminescent sides of the target electrode 12 is mounted in the respective tube necks. For example, in the neck 18, there is provided an electron gun 20 which may be of conventional construction. The electron beam 21 produced by the gun 20 is suitably focussed and directed toward the black and white phosphor screen 14 by conventional means (not shown). The beam also is conventionally deflected by a suitable system represented by a yoke 22 so as to scan a television raster in the plane of the screen 14.

Another electron gun 23 is mounted in the tube neck 19 and the electron beam 24 generated thereby is directed toward the colored line phosphor screen including elements 15, 16 and 17. The beam 24 also is deflected over the target electrode to scan a conventional television raster by means such as a yoke 25.

In the case where such a device is used in a dot multiplex system, suitable color selection may be effected by additionally displacing the electron beam 24 vertically during each horizontal line scansion. This type of beam deflection may be accomplished either electrostatically or electromagnetically, as desired. In the present instance, electromagnetic deflection is employed for color-selecting purposes. A color deflection coil 26 is provided for this purpose. This coil will be understood to produce a field for deflecting the beam 24 vertically so that at succeeding instants the beam excites the phosphor strips such as 15, 16 and 17 in a predetermined sequence, to provide red, green and blue light, respectively.

Since the target electrode 12 of cathode ray tube 11 is a transparent structure it may be viewed from either side. As indicated in the drawing the luminescent screens are viewed from the right.

The television signal receiving apparatus includes a conventional composite television signal receiver 27. It will be understood that this apparatus includes the usual radio frequency amplifier, a frequency converter, an intermediate frequency amplifier and a second or signal detector. Accordingly, there is derived from the receiver 27 the horizontal and vertical synchronizing signals which are impressed on synchronizing signal channel apparatus 28. This apparatus is conventional and serves to separate the synchronizing signals from the video signals and to further separate the horizontal and vertical synchronizing signals from one another. The synchronizing signals derived from the aparatus 28 are impressed upon deflection wave generators 29. Again, this apparatus may be entirely conventional. It comprises the usual saw-tooth wave generators operating at both horizontal and vertical frequencies, the outputs of which are impressed upon deflection yokes 22 and 25. By means of this conventional arrangement the electron beams 21 and 24 are caused to scan conventional television rasters at the target electrode 12.

The synchronizing signal channel apparatus 28 also is coupled to a color deflection generator 31. This apparatus functions to generate a wave of predetermined form at the color-changing frequency in a dot or elemental multiplex television system. For example this frequency may be of the order of 3.6 mc. For line or field sequential systems, the frequency of the waves generated by the color deflection generator 31 may be considerably lower to correspond with the line or field repetition rate. Also, the form of the wave developed by the color deflection generator 31 may be sinusoidal, square, sawtooth or the like. The wave developed by the generator 31 is impressed upon the color deflection coil 26 to vary the position of the beam 24 in the manner previously described.

The video signals derived from the receiver 27 are separated in accordance with the frequency components thereof. This is accomplished by impressing the video signals derived from the receiver 27 upon the low and high frequency video signal channels 32 and 33, respectively. Only the relatively low frequency video signal component such as for example, from 0 to 2 mc. is conveyed through the channel 32. Similarly, the channel 33 passes only the relatively high frequency component from, such as for example, 2 to 4 mc.

The described apparatus functions to produce the television image substantially in its natural colors in the following manner. Most of the image detail is represented by the relatively high frequency component of the video signals. Since this component is impressed upon the electron gun 20, it is seen that the beam 21, in scanning the black and white phosphor screen 14, reproduces in black and white an image in its finest detail. At the same time the impression upon the electron gun 23 of the relatively low frequency video signal component causes the beam 24 to suitably excite the color phosphor screen to reproduce the component image colors. Since the two beams 21 and 24 are adjusted to scan the two opposite sides of the target electrode 12 substantially in register it is seen that there is produced a color reproduction of the desired image.

It will now be more fully appreciated that the present invention is of a character that substantial economies may be effected in the construction of the image-reproducing apparatus such as represented by the tube 11 of Figure 1. In color kinescopes for employment in prior art systems, not only the color information but also the detail of the image is reproduced by the colored light-emitting electrode structure. Such structures were required to be fabricated with a high degree of precision. The precision was required because the size of the individual color-reproducing phosphor areas was determinative of the fineness of picture detail which could be realized. In such prior art systems, there could be reproduced no greater image detail than the tube electrode structure would permit. Accordingly, it was necessary to manufacture color kinescopes with color-producing electrode structure having a relatively high order of fineness. This requirement added materially to the cost of manufacturing such apparatus.

Inasmuch as the present invention provides for the reproduction of image detail by means including a conventional black and white screen, it is necessary that the color screen be only sufficiently fine in structure to produce the desired color information. Accordingly, substantial economies of tube manufacture may be effected in the production of tubes for use in conjunction with systems operating according to the present invention.

Another embodiment of the invention is illustrated in Figure 2 to which reference now will be made. In this form of the invention there is used cathode ray apparatus of the general type shown in U. S. Patent 2,481,839 granted to A. N. Goldsmith on September 13, 1949, and titled "Color Television." Cathode ray tube 34 is of this type with an added black and white luminescent screen such as that referred to in connection with the embodiment of the invention shown in Figure 1. The target electrode 35 of the tube 34 also is transparent and includes a supporting base 36. The black and white phosphor screen 37 is conventionally formed on the right hand surface of the support 36. On the left hand surface of the electrode support there is formed a directional multi-color luminescent screen as more fully disclosed in the Goldsmith patent to which reference has been made. In general, the color screen consists of a multiplicity of triangular pyramids such as 38. Corresponding faces of these pyramids are coated with phosphors capable of producing differently colored light when electronically excited. For example, the faces such as 39 are treated to produce red light when impinged by an electron beam. The faces such as 41 are coated with a phosphor which produces blue light when impinged by an electron beam. The other faces (not shown) of the pyramids are coated with phosphors capable of producing green light when impinged by a beam.

A multi-color luminescent screen of this character is directional in its operation to selectively reproduce the desired image colors. In order to produce red light the pyramid faces such as 39 may be excited only when an electron beam impacts them from a point located substantially above the horizontal axis of the tube as viewed in this figure. Similarly, the blue light-producing faces such as 41 of the pyramids may be excited only when struck by a beam emanating from a point substantially below the horizontal tube axis. In a similar manner, the green light-producing faces of the pyramids are excited by an electron beam emanating from a point located behind the plane of the drawing.

For producing the differently colored image light the cathode ray tube 34 is provided with a plurality of necks or tubulations 42, 43 and 44. These necks are angularly related to the central horizontal axis of the tube in such a way that there may be directed toward the screen 35 the different electron exciting beams. Electron guns 45, 46 and 47 for example, are mounted respectively in the necks 42, 43 and 44 for producing electron beams 48, 49 and 50 to excite respectively the red, green and blue faces of the color screen pyramids.

The tube 34 is provided with an additional neck or tubulation 51 extending angularly from the body portion in a direction generally opposite to that in which the necks 42, 43 and 44 extend.

There is mounted in the neck 51 an electron gun 52 by which to develop an electron beam 53. This beam is directed toward the black and white luminescent screen surface 37.

It will be understood that there is provided, in association with each of the electron guns, suitable focussing and beam-deflecting apparatus to cause the respective electron beams to scan a conventional television raster over the target electrode 35. Such apparatus is not shown in detail in order to avoid unnecessary complication of the drawing. It will be understood, however, that such apparatus may be entirely conventional in form and may be conventionally operated so that all of the electron beams 48, 49, 50 and 53 are caused to impinge upon corresponding elemental areas of the target electrode 35 concurrently.

The system for operating the cathode ray apparatus including the tube 34 in accordance with the invention is somewhat similar to that described in connection with Figure 1. The video signal derived from the receiver 27 is impressed simultaneously upon the low and high frequency channels 32 and 33 respectively. The video signal frequencies between 2 and 4 mc. only are derived from the channel 33 and are impressed upon the electron gun 52. In this way, as in the preceding instance, there is reproduced by the black and white screen 37 a detailed image lacking only the color information.

The relatively low frequency component of the video signal from 0 to 2 mc. is derived from the channel 32 and is impressed upon color sequence switching apparatus 54. This apparatus functions to separate the video signal according to the image colors which they represent. One type of color sequence switch which may be used in the present system is shown and described in the copending Evans application referred to. Another circuit for accomplishing this result is shown in a copending U. S. application of George C. Sziklai, Ser. No. 117,533, filed September 24, 1949, and titled "Color Television Reproducing System."

The red representative video signals derived from the sequence switch 54 are impressed upon a red video signal channel 55 from which they are impressed upon the red electron gun 45. Similarly, the green and blue representative color video signals are conveyed, respectively, by green and blue channels 56 and 57 for impression upon electron guns 46 and 47. The operation of the form of the invention shown in Figure 2 will be readily understood in view of the foregoing description of the manner in which the apparatus of Figure 1 operates. The picture detail is reproduced by the black and white screen 37 and the color information is reproduced by the color screen on the opposite side of the support 36.

As pointed out previously in describing some of the advantages of the form of the invention shown in Figure 1, the present embodiment of the invention may utilize an image-reproducing tube 34 of somewhat simplified construction. The color-reproducing screen of the electrode 35 may be made with a somewhat coarser color structure than in the case where such an electrode is required to reproduce not only the color information of the image but also the detail thereof. As a result, substantial economies of tube fabrication may be realized.

Figure 3:
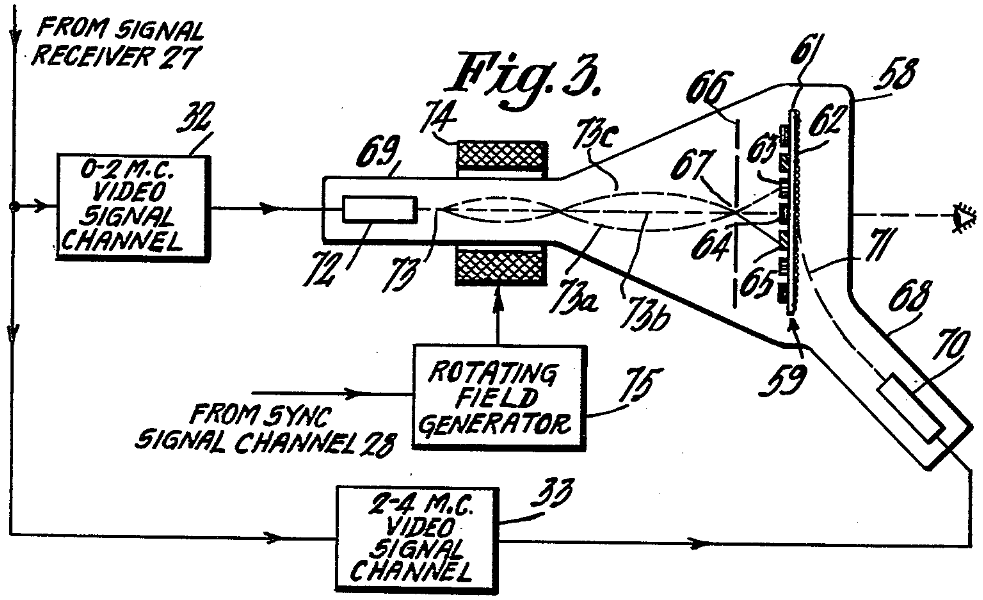
Figure 3 is still another diagrammatic illustration of an embodiment of the invention employing a multi-color kinescope having a luminescent screen in which the phosphors have dot formations; and, Figure 4 is still another embodiment of the invention using a plurality of kinescopes.

Another embodiment of the invention is shown in Figure 3 to which reference now will be made. In this system the cathode ray apparatus comprises a tube 58 having transparent double-sided luminescent screen electrode 59. As in the other described forms of the invention the electrode 59 includes a transparent support 61. On one face of the support there is formed a white luminescent screen 62. The other side of the support is provided with a multi-color luminescent screen. In the present case, the color screen is made up of a multiplicity of phosphor areas of subelemental dimensions. The phophor areas are arranged in groups, each of which includes individual areas capable, respectively, of producing light of the different component image colors when excited by an electron beam. A typical tube having a screen of such a character is shown in a copending U. S. application of A. N. Goldsmith, Ser. No. 762,175, filed July 19, 1947, now Patent No. 2,630,542 issued March 3, 1953, and titled "Multicolor Television." Each group of phosphor areas, for example, may include elements such as 63, 64 and 65 capable, respectively, of producing red, green and blue image colors.

A screen of this character is selectively activated by electron beam components approaching it from different angles. For this purpose, there is provided an apertured masking electrode 66 spaced somewhat from the luminescent screen and having an aperture such as 67 in alignment with each group of phosphor areas.

The tube 58 also is provided with extending necks or tubulations 68 and 69. There is mounted in the neck 68 an electron gun 70 for producing an electron beam 71 by which to excite the white phosphor screen 62. Similarly, there is mounted in the neck 69 an electron gun 72 for developing a beam 73 by which to excite the color phosphor screen.

The electron beams 71 and 73 are deflected by suitable deflecting systems to scan conventional television rasters on the respective luminescent screens of the target electrode 59. Also, associated with the electron beam 73, there is provided a magnetic yoke 74 which may be energized to create a rotating field to the influence of which the beam 73 may be subjected. By means of this rotating field the beam 73 is rotated so as to produce, at successive instants, the beam components 73*a*, 73*b* and 73*c*, as indicated in the drawing. These beam components approach the screen electrode from different angles. Consequently, those portions of the beam components which are permitted to pass through the apertures, such as 67, in the masking electrode 66 have approach directions suitable to excite only single ones of the phosphor areas such as 63, 64 and 65. In this way color selection is obtained.

The yoke 74 is energized from a rotating field generator 75. The energy developed by the rotating field generator is maintained in synchronism with the received video signals under the control of the synchronizing signal channel apparatus 28, as indicated. The electron gun 70 is energized by the relatively high frequency component of the received video signals by means of the indicated coupling to the 2–4 mc. video signal channel 33. Similarly the 0–2 mc. signal channel 32 is coupled to the electron gun 72 so that it may be energized in response to the relatively low frequency component of the received video signals.

The operation of this form of the invention is substantially similar to that previously described. The electron beam 71 excites the white luminescent screen 62 in accordance with the high frequency video signal component to effect a black and white reproduction of the image details. At the same time, the electron beam 73, under the control of the relatively low frequency video signal component, excites the multicolor luminescent screen to reproduce the color information of the image. Both of the reproduced image components are viewed concurrently.

The electrode structure of the tube 58 of Figure 3 by which the image color is reproduced may be somewhat coarser than would otherwise be required for a tube intended to operate in any of the other prior art systems. In this case, as in the others previously described, the phosphor areas such as 63, 64 and 65 are not required to be of such a high order of fineness. In addition, the masking electrode 66 may be fabricated with a smaller number of apertures. It is seen that, in both cases, it is possible to realize substantial economies of construction by reason of the employment of such a tube in a system in accordance with the present invention.

Figure 4:
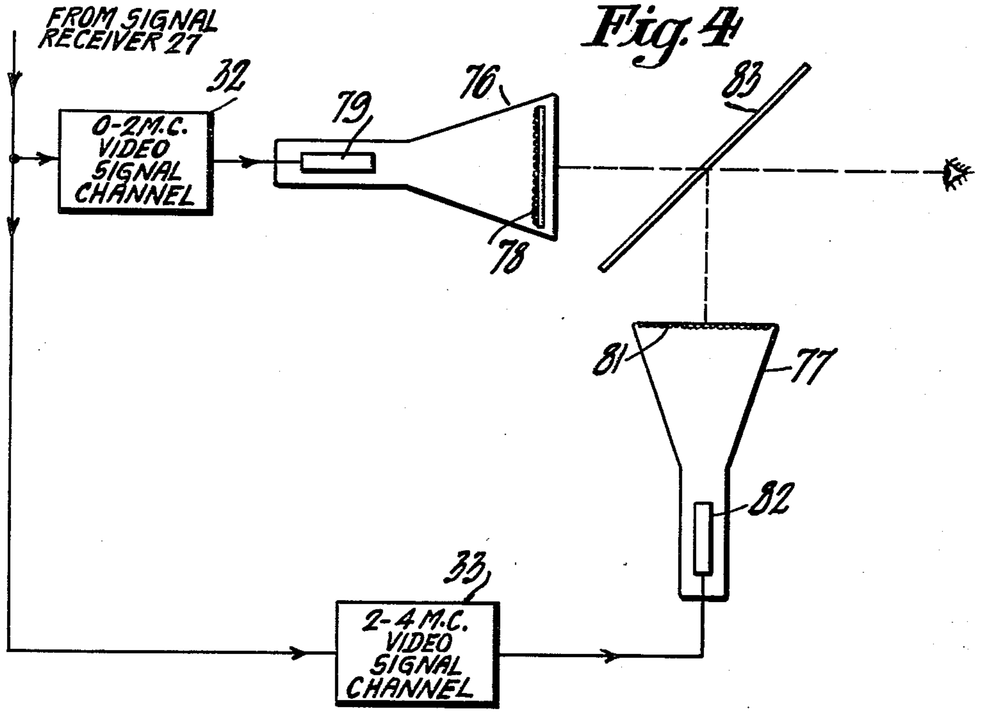

The invention does not necessarily have to be embodied in a system employing a single cathode ray tube for the reproduction of the color and detail information of the image. One embodiment of the invention employing a plurality of cathode ray tubes is indicated in Figure 4 to which reference now will be made. This system includes a color kinescope 76 and a black and white kinescope 77. The tube 76 may be similar to any of the general types previously referred to for the reproduction of color television images. Alternatively this tube may be of any other desired type so long as it is capable of reproducing television images substantially in their natural colors. The tube 77 may be a conventional black and white kinescope used generally in television receivers, oscilloscopes and the like.

The luminescent screen 78 of the tube 76 is provided with phosphors or other luminescent material which may be selectively excited to produce the component image colors by an electron beam derived from a gun 79. It will be understood that this representation of a color kinescope is merely diagrammatic. The luminescent screen 78 may be formed of strips or dots of luminescent material and may or may not be provided with suitable masking or other electrode structure for selectively exciting the screen phosphors. Similarly, the electron gun 79 is intended to represent, not only a single gun, but alternatively, if desired, a plurality of guns. The luminescent screen 81 of the tube 77 may be a conventional phosphor screen as used generally in cathode ray tubes for black and white television image reproduction. The screen 81 is capable of emitting white light in response to excitation by an electron beam derived from a gun 82.

The kinescopes 76 and 77 are mounted in such relation to one another so that the images reproduced upon the respective luminescent screens thereof may be optically combined for simultaneous viewing. One such arrangement is shown diagrammatically. The screens 78 and 81 of the kinescopes 76 and 77 are mounted substantially at right angles to one another. Interposed between the tube screens there is mounted an optical system for combining the two images. In this case, the optical system comprises a half silvered mirror 83. When viewed from the right, the color image reproduced upon the screen 78 of the kinescope 76 may be seen through the half silvered mirror 83. At the same time, the black and white image appearing upon the screen 81 of the kinescope 77 may be seen by reflection from the mirror 83.

As in the other embodiments of the invention previously described, the relatively low frequency component of the video signal which is derived from the 0 to 2 mc. channel 32 is impressed upon the electron gun 79 of the color kinescope 76. Similarly, the 2 to 4 mc. channel 33 is coupled to the electron gun 82 of the black and white kinescope 77 for the purpose of impressing upon this tube the relatively high frequency component of the video signal. Accordingly, the detail of the image is reproduced in black and white upon the screen 81 of the kinescope 77. At the same time the color information of the image is reproduced upon the screen 78 of the color kinescope 76. Accordingly, when both of such images are simultaneously viewed in good optical registration, a complete television image is presented.

It will be appreciated, in view of the foregoing description of other embodiments of the invention, that the same kind of construction economies may be realized in the fabrication of the color kinescope 76 as in any of the other types of tubes previously described.

From the foregoing description of a number of illustrative embodiments of the invention, it will be seen that there is provided a color television image-reproducing system representing substantial improvement over previously employed systems. The improvement is realized chiefly because of the utilization of the principles of mixed high frequencies of the video signals. Utilization of these principles, in accordance with the present invention, enables the design of a television signal-receiving and image-reproducing system in which apparatus of considerably simpler construction may be employed.

As pointed out previously, in the detailed description of each of the illustrative embodiments of the invention disclosed herein, one of the chief constructional economies to be realized is in the fabrication of the color kinescope. The employment of the mixed high frequency principles as in the present invention, requires that the light-producing electrode structure of the color kinescope have no greater fineness of detail than that represented by the relatively low frequency component of the video signals employed to energize the apparatus. Accordingly, the manufacture of such electrode structures is considerably cheaper than that of similar structures which may be required to reproduce all of the picture detail.

The nature of the invention may be determined from the foregoing description of a number of illustrative embodiments thereof. The scope of the invention is set forth in the appended claims.

What is claimed is:

1. In a color television image-reproducing system, means for receiving video signals representative of an image to be reproduced, said video signals having a relatively low frequency component and a relatively high frequency component, one of said video signal components being representative of a plurality of component image colors and the other of said video signal components being representative of the detail of said image, cathode ray apparatus including separate electron beam-developing means both coupled to said signal receiving means and responsive, respectively, to said two video signal components and luminescent screens associated, respectively, with said separate electron beam-developing means for excitation by said developed electron beam energy, said luminescent screens being of the types, respectively, for reproducing said component image colors and for reproducing said image detail in black and white, and both of said luminescent screens being arranged relative to one another in such a manner that the respective image reproductions may be viewed simultaneously.

2. In a color television image-reproducing system, means for receiving video signals representative of an image to be reproduced, said video signals having a relatively low frequency component and a relatively high frequency component, one of said video signal components being representative of a plurality of component image colors and the other of said video signal components being representative of the detail of said image, cathode ray apparatus including electron beam-developing means coupled to said signal receiving means and responsive to one of said video signal components and a luminescent screen of a kind for reproducing said component image colors in response to excitation by said developed electron beam energy, and additional cathode ray apparatus including electron beam-developing means coupled to said signal receiving means and responsive to the other of said video signal components and a luminescent screen of a kind for reproducing said image detail in black and white, both of said luminescent screens being arranged relative to one another in such a manner that the respective image reproductions may be viewed simultaneously.

3. In a color television image-reproducing system, means for receiving video signals representative of an image to be reproduced, said video signals having a relatively low frequency component and a relatively high frequency component representative, respectively, of a plurality of component image colors and of the detail of said image, cathode ray apparatus responsive to said low frequency video signal component and including electron beam-developing means coupled to said signal receiving means and a luminescent screen of a kind for reproducing said component image colors in response to excitation by said developed electron beam energy, and additional cathode ray apparatus responsive to said high frequency video signal component and including electron beam-developing means coupled to said signal receiving means and a luminescent screen of a kind for reproducing said image detail in black and white, both of said luminescent screens being arranged relative to one another in such a manner that the respective image reproductions may be viewed simultaneously.

4. In a color television image-reproducing system, means for receiving video signals representative of an image to be reproduced, said video signals having a relatively low frequency component and a relatively high frequency component representative, respectively, of a plurality of component image colors and of the detail of said image, cathode ray apparatus including electron beam-developing means coupled to said signal receiving means and responsive to said low frequency video signal component and a luminescent screen of a type for reproducing said component image colors in response to excitation by said developed electron beam energy, and additional cathode ray apparatus including electron beam-developing means coupled to said signal receiving means and responsive to said high frequency video signal component and a luminescent screen of a type for reproducing said image detail in black and white, both of said luminescent screens being arranged relative to one another in such a manner that the respective image reproductions may be viewed simultaneously in substantially exact optical register.

5. A color television image-reproducing system as defined in claim 1, wherein said cathode ray apparatus is mounted in a single evacuated envelope, said luminescent screens form a unitary target electrode, there being developed at least one electron beam for exciting each of said screens, one of said electron beams being modulated by said high frequency video signal component to excite said black and white screen, and the other of said electron beams being modulated by said low frequency video signal component to excite said color screen.

6. A color television image reproducing system as defined in claim 5, wherein said target electrode is two-sided and transparent with said black and white screen on one side and said color screen on the other side, and there being developed only one electron beam for exciting said black and white screen.

7. A color television image-reproducing system as defined in claim 6, wherein there is developed only one electron beam for exciting said color screen, and having additionally means for controlling the position of said color-producing electron beam to effect selective color reproduction.

8. A color television image-reproducing system as defined in claim 1, wherein said cathode ray apparatus comprises a two-sided transparent target electrode having a black and white luminescent screen on one side and a directional color luminescent screen on the other side, there being developed a single electron beam for exciting said black and white screen and an individual electron beam for each of said component image colors for exciting said color screen, said single beam being modulated by said high frequency video signal component, and having additionally means for separating said high frequency video signal component into its constituent color-representative video signals for modulating said respective individual electron beams.

9. A color television image-reproducing system as defined in claim 1, wherein said cathode ray apparatus comprises a separate envelope for each of said luminescent screens, and having additionally optical means for viewing said screens simultaneously.

10. In a television system for reproducing an image in substantially its natural colors, means for receiving video signals having a plurality of components respectively covering different frequency ranges, one of said video signal components being representative of a plurality of the component colors of said image and the other of said video signal components being representative of the detail of said image, cathode ray apparatus having luminescent screen elements respectively capable of reproducing said component image colors and of reproducing said image detail in black and white, both of said luminescent screen elements being arranged relative to one another in such a manner that the respective image reproductions may be viewed simultaneously, means for developing electron beam energy by which to excite said luminescent screen elements, means responsive to said color-representative video signal component for controlling said electron beam energy for the excitation of said color reproducing luminescent screen element, and means responsive to said detail-representative video signal component for controlling said electron beam energy to excite said black and white reproducing luminescent screen element.

11. A cathode ray tube comprising, target electrode structure including a first relatively high resolution luminescent screen for producing light having a predetermined spectral range and a second relatively low resolution luminescent screen for producing light of a plurality of different spectral ranges, said two luminescent screens being so arranged relative to one another that they may be viewed simultaneously substantially in exact registration, and means for developing electron beam energy and for directing it to excite said two luminescent screens.

12. A cathode ray tube comprising, a target electrode structure including a first substantially continuous type of luminescent screen for producing light of a first predetermined color and a second discontinuous type of luminescent screen for producing light of a plurality of different colors, said two luminescent screens being arranged relative to one another so that they may be viewed in substantially exact registration, and means for developing electron beam energy and for directing it to selectively excite said two luminescent screens.

13. A cathode ray tube comprising, a unitary target electrode including a first luminescent screen having a relatively high resolution capability for producing substantially white light and a second luminescent screen having a relatively low resolution capability for producing light of a plurality of different colors, said two luminescent screens being arranged relative to one another in such a manner that they may be viewed simultaneously, means for developing a first electron beam and for directing it to excite said first luminescent screen, and means for developing a second electron beam and for directing it to excite said second luminescent screen.

References Cited in the file of this patent

UNITED STATES PATENTS

| Number | Name | Date |
|---|---|---|
| 2,446,791 | Schroeder | Aug. 10, 1948 |
| 2,480,848 | Geer | Sept. 6, 1949 |
| 2,481,839 | Goldsmith | Sept. 13, 1949 |
| 2,492,926 | Valensi | Dec. 27, 1949 |
| 2,509,038 | Goldsmith | May 23, 1950 |
| 2,516,314 | Goldsmith | July 25, 1950 |
| 2,554,693 | Bedford | May 29, 1951 |